United States Patent [19]

Cheon

[11] Patent Number: 5,323,243
[45] Date of Patent: Jun. 21, 1994

[54] METHOD FOR CONTINUOUSLY RECORDING ON A SELECTED TAPE IN A DOUBLE DECK VIDEO CASSETTE RECORDER

[75] Inventor: Byeong-Hoo Cheon, Seoul, Rep. of Korea

[73] Assignee: Daewoo Electronics Company, Ltd., Seoul, Rep. of Korea

[21] Appl. No.: 33,809

[22] Filed: Mar. 22, 1993

[30] Foreign Application Priority Data

Mar. 23, 1992 [KR] Rep. of Korea ............... 92-4754

[51] Int. Cl.$^5$ ............................................. H04N 5/76
[52] U.S. Cl. ................................. 358/335; 358/311; 360/32
[58] Field of Search ............. 358/335, 310, 311; 360/14.1, 5, 13, 15, 32, 33.1; 84/461; 369/6, 7, 84

[56] References Cited

U.S. PATENT DOCUMENTS

| | | | |
|---|---|---|---|
| 5,008,762 | 4/1991 | Sung | 360/61 |
| 5,038,220 | 8/1991 | Eguchi | 358/310 |
| 5,194,963 | 3/1993 | Dunlap et al. | 358/314 |
| 5,257,142 | 10/1993 | Hong | 360/33.1 |

OTHER PUBLICATIONS

Herrington Co., Horizon Go. Video, Front page.

Primary Examiner—Tommy P. Chin
Assistant Examiner—Robert Chevalier
Attorney, Agent, or Firm—William F. Pinsak

[57] ABSTRACT

A method for the continuous recording of irregularly supplied video signals on a selected video tape in a double deck video cassette recorder comprises the steps of: (a) setting a period of time allowing the video cassette recorder to operate in a recording mode during the period of time; (b) selecting any operable one of the two decks to drive a tape loaded therein in response to a trigger signal initiating the recording operation of the selected deck; (c) registering a reference signal to indicate that the selected deck is operable in the recording mode; (d) holding the selected deck in a stand-by state until another trigger signal is generated after the completion of the recording operation during the period of time; (e) referencing the reference signal in order to determine whether the selected deck remains operable to continuously drive the tape loaded therein when said another trigger signal is generated; (f) selecting the remaining operable deck so as to have the recording operation transferred thereto when the tape in the previously selected deck in step(b) has completed its recording operation; and (g) repeating the steps from(c) to: (f).

3 Claims, 4 Drawing Sheets

METHOD FOR CONTINUOUSLY RECORDING ON A SELECTED TAPE IN A DOUBLE DECK VIDEO CASSETTE RECORDER

FIELD OF THE INVENTION

The present invention relates to a recording method onto a tape in a video cassette recorder, more particularly, to a method for the continuous recording of irregularly supplied video signals on a selected tape in a double deck video cassette recorder.

BACKGROUND OF THE INVENTION

Typically, a double deck video cassette recorder (hereinafter referred to as a "VCR") having two video decks comprises a drive mechanism for a master tape and another drive mechanism for a slave tape. Conventional double deck VCRs of this kind may perform a tape to tape duplication (dubbing) operation wherein the playback operation by one of the tape drive mechanisms and the recording operation by the other tape drive mechanism can be started at the same time; and a linking operation wherein the recording operation (or playback operation) by one of the tape drive mechanisms can be started simultaneously with the completion of recording operation (or playback operation) by the other tape drive mechanism in addition to the conventional recording or playback operation, as is disclosed in, e.g., Japanese Patent No. 2588/1979 of Hitachi Ltd.

The linking operation in the double deck VCR may be used in an automatic monitoring system adapted to successively record from one tape to the other scenes captured by a video camera installed in a restricted or security area whenever the entrance into the area is sensed by a sensing means.

However, one of the drawbacks of the linking operation which may be employed in the monitoring system is that it is limited to a one-time performance from the master tape to the slave tape and initiated from the master tape only; and, as a result, it is impossible to continuously record between the two tapes or to fully record on the entire portion of the slave tape.

SUMMARY OF THE INVENTION

Therefore, it is an object of the present invention to provide a method for the continuous recording of irregularly supplied video signals on a selected single cassette tape in a double deck VCR.

It is another object of the present invention to provide a method for repeatedly recording video signals on from one tape to the other in a double deck VCR.

In accordance with an embodiment of the present invention, provided herein is a novel method for continuously recording on a selected video cassette tape in the double deck VCR, the method comprising the steps of: (a) setting a period of time allowing the video cassette recorder to operate in a recording mode during the period of time; (b) selecting any operable one of the two decks to drive a tape loaded therein in response to a trigger signal initiating the recording operation of the selected deck; (c) registering a reference signal to indicate that the selected deck is operable in the recording mode; (d) holding the selected deck in a stand-by state until another trigger signal is generated after the completion of the recording operation during the period of time; (e) referencing the registered reference signal in order to determine whether the selected deck remains operable to continuously drive the tape loaded therein when said another trigger signal is generated; (f) selecting the remaining operable deck so as to have the recording operation transferred thereto when the tape in the previously selected deck in step (b) has completed its recording operation; and (g) repeating the steps from (c) to (f).

BRIEF DESCRIPTION OF THE DRAWINGS

The above and other objects and features of the present invention will become apparent from the following description and the accompanying drawings.

DETAILED DESCRIPTION OF THE PREFERRED EMBODIMENTS

Figure 1:
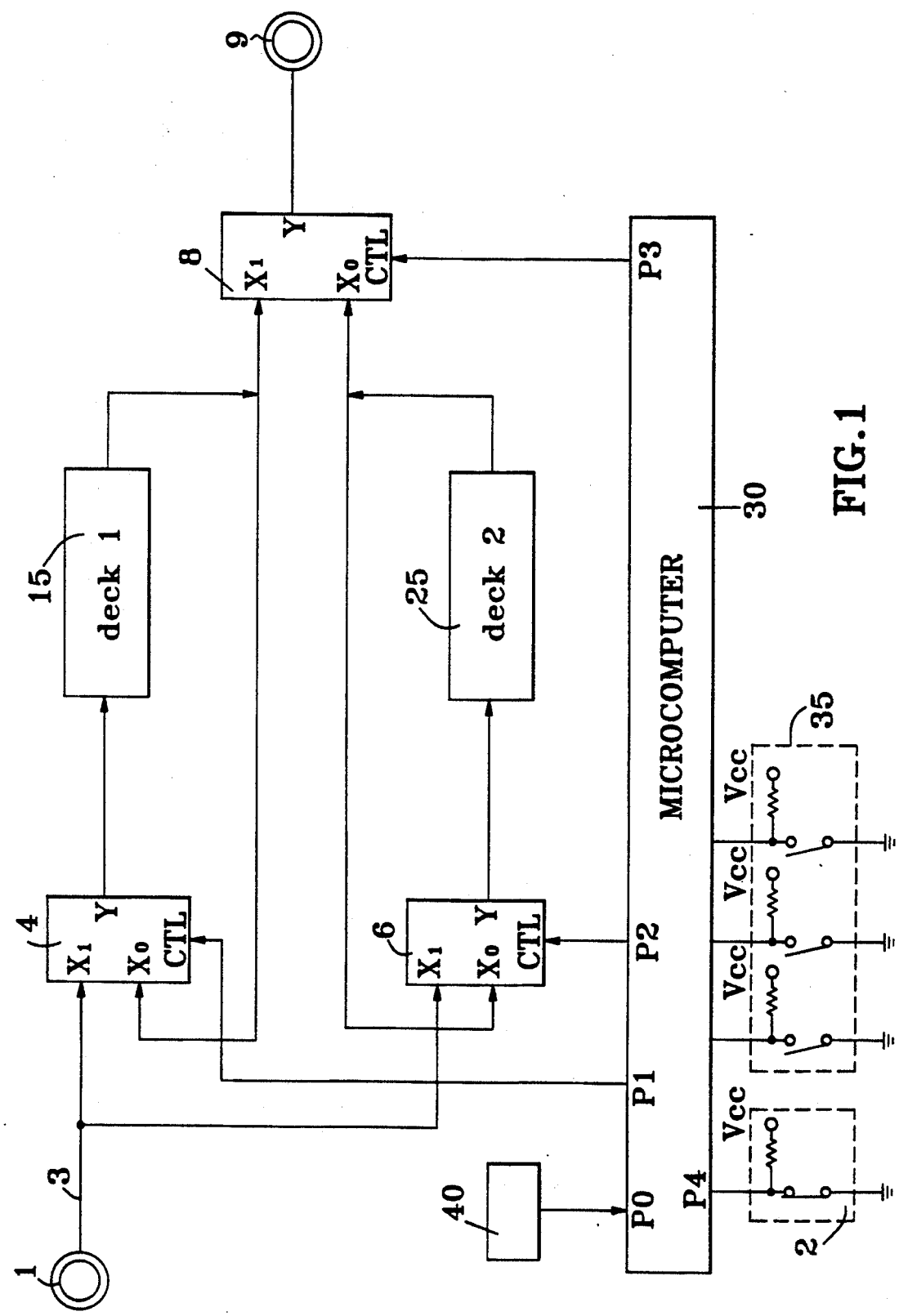
FIG. 1 is a schematic block diagram of a double deck VCR adapted to implement a continuous recording method of the present invention.

Referring to FIG. 1, there is shown a block diagram of a double deck VCR adapted to implement the present invention. The double deck VCR comprises a first deck 15 and a second deck 25 in which video cassette tapes are loaded, respectively. Each of the decks 15 and 25 serves to record an input video signal on the video tape loaded therein as well as to play out recorded signals therefrom.

The double deck VCR further comprises a pair of input selection switches 4 and 6 and an output switch 8 for the first and the second decks 15 and 25. Each of the input selection switches 4 and 6 has an input port X1 for receiving video signals from a video source such as a video camera which is installed in ,e.g., a restricted area and an output port Y which is connected to each of the input ends of the decks 15 and 25, the video signals being applied to the respective decks 15 and 25 through a line 3 from an "IN" jack 1 connected to the video camera. The output selection switch 8 is used to selectively apply to an "OUT" jack 9 the selected video signal from the first and the second decks 15 and 25 by changing its inner connection state and has a pair of input ports X0 and X1 connected to each of the output ends of the decks 15 and 25 and an output port Y connected to the OUT jack 9.

Each of the control ports CTLs of the input and the output selection switches 4, 6 and 8 is connected to output ports P1, P2 and P3 of a microcomputer 30, respectively. Connected to an input port P0 of the microcomputer 30 is sensing means, for example, an infrared sensor 40 for sensing the entrance into the restricted area and generating a sensed signal to trigger the microcomputer into operation.

A switch 2 connected to an input port P4 of the microcomputer 30 serves to select the mode of continuous recording operation of the double deck VCR in accordance with the present invention. When the switch 2 is in ON position and the sensed signal is applied to the input port P0 of the microcomputer 30 as a trigger signal, the microcomputer 30 sets the output ports P1 and P2 at logic "1" (or high level "H") to cause the double deck VCR to operate in the continuous recording mode so that the input port X1s of the switch 4 and 6 are connected to the input jack 1, respectively.

An adjustable time switch 35 having a set of three switches functions to set a period of time for the recording operation of any selected deck when the double deck VCR is operated in the continuous recording mode. That is, the ON/OFF combination of the respective switches 35 may generate various binary signals. The microcomputer 30 in response to a binary signal allows the selected deck to operate in the recording mode for a predetermined time corresponding to the binary signal.

The double deck VCR may also be operable in a tape to tape duplication(dubbing) mode by controlling one of the input ports X1 in the input selection switches 4 and 6 to be connected to the output end of the opposite deck. If the user wants to operate the double deck VCR in one of the multiple modes such as the playback or recording mode, the user selects the pertinent mode so that the microcomputer 30 sets the ports P1, P2 and P3 at logic 0 or logic 1.

In the following, the continuous recording operation of the double deck VCR constructed as in FIG. 1 will be explained with reference to FIG. 2, in which the switch 2 is in ON position to select the continuous recording mode.

First, the microcomputer 30 initializes flags F1, F2, and F3 to logic "0" (or "L" level) in step S1. These flags are provided in the microcomputer 30, e.g., one of HMCS 400 series made by HITACHI, Japan; and the flags F1 and F2 are set to "H" level for the indication of the first and the second decks 15 and 25 being associated with the continuous recording mode in accordance with the present invention and the flag F3 is set to "H" level for the indication of a timer being driven when the trigger signal is generated.

When it is determined that the switch 2 is in ON position in step S2, the microcomputer 30 provides H level to each of the control ports CTLs of the input selection switches 4 and 6 through the respective output ports P1 and P2 so that the ports X1s of the switches 4, 6 are connected to the input jack 1 for receiving video signals from the video camera. In this situation, when the sensed signal by the sensor 40 is applied to the input port P0 of the microcomputer 30 in step S4, the microcomputer 30 sets the flag F3 at logic 1 in step S5. In steps S6 and S7, a corresponding timer starts to count for a predetermined time set by the adjustable time switch 35. In step S8, it is tested that the recording operation is completed for the predetermined time. If the test result in this step S8 is YES, control passes to step S10 after clearing the flag F3 at logic 0 in step S9. Otherwise, control directly advances to step S10.

Figure 2A:
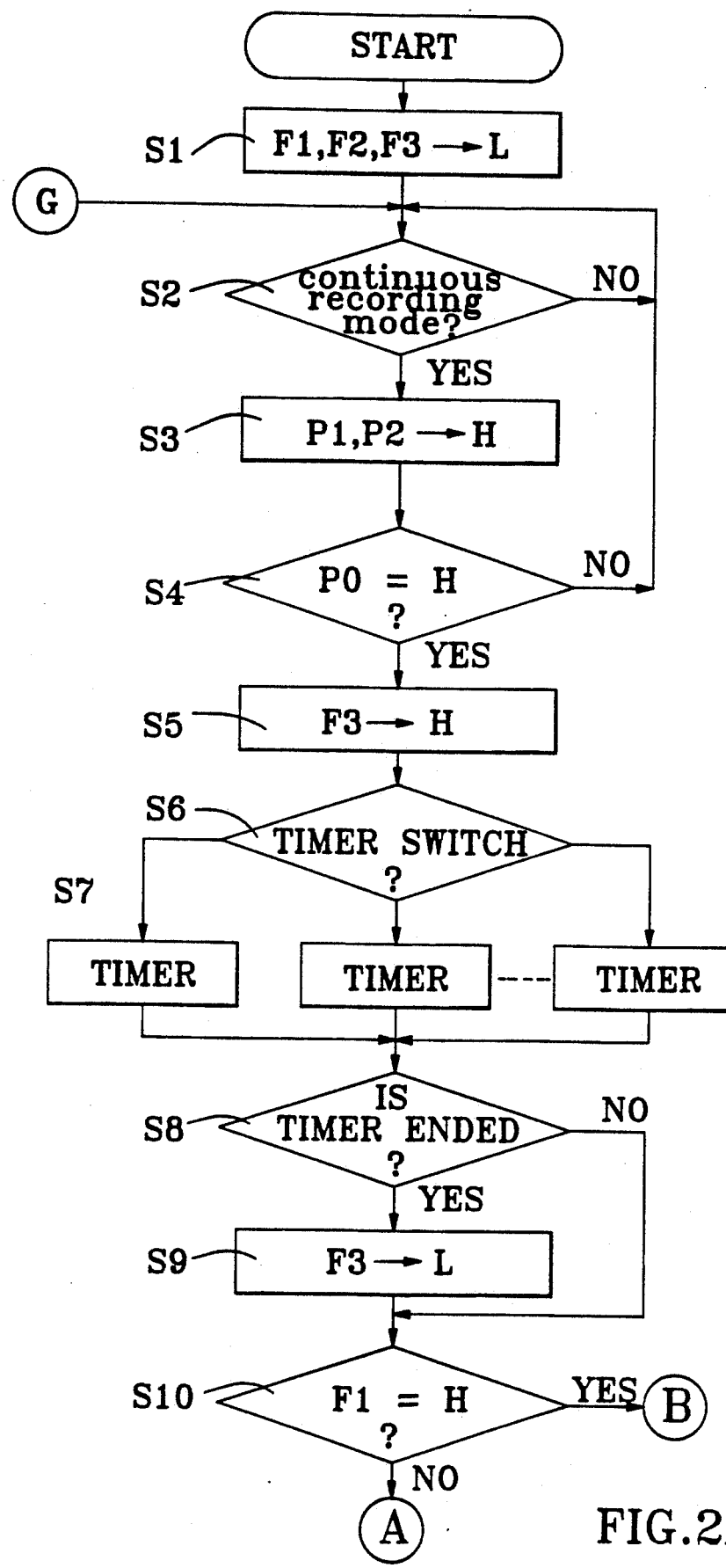
FIG. 2 is a flow chart of a control program executed by the microcomputer shown in FIG. 1.
Figure 2B:
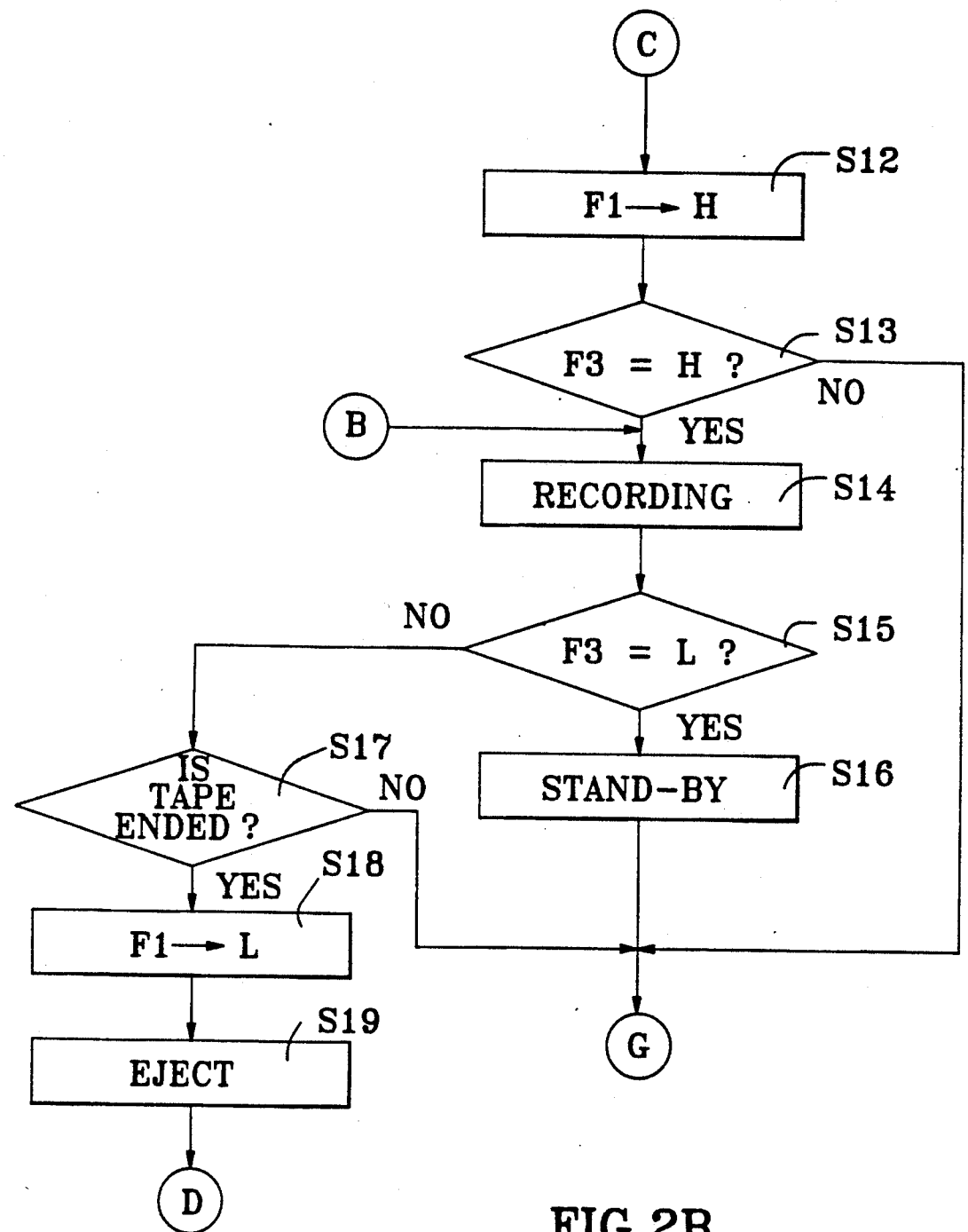
Figure 2C:
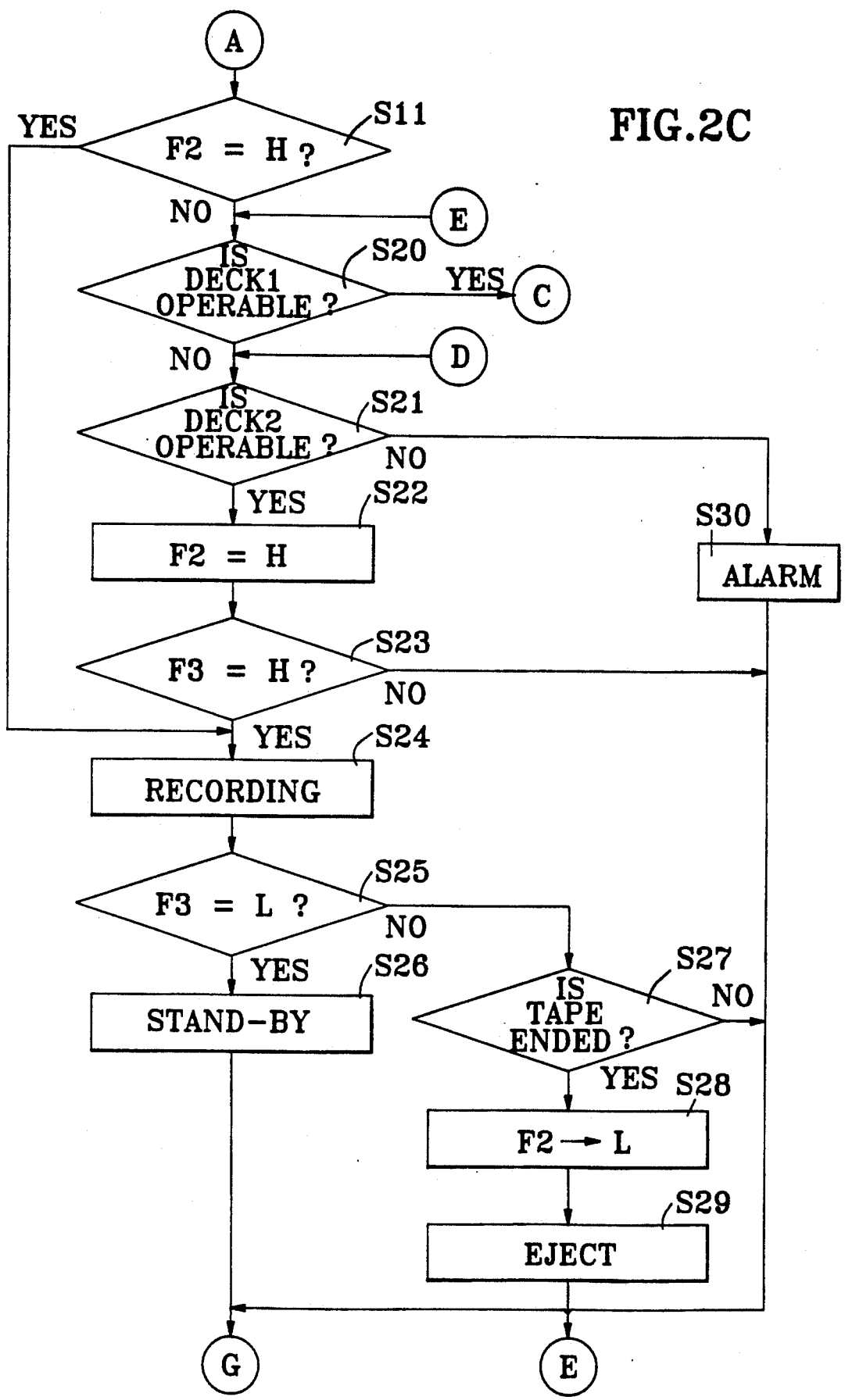

In step S10 or S11 in FIG. 2C, the flag F1 or F2 is referenced to determine whether the continuous recording operation has been progressed in either the first deck 15 or the second deck 25. If the flag F1 has been set at logic 1 in step S10, it means that the first deck 15 has been related to the continuous recording operation. Therefore, the video tape loaded in the first deck 15 will be driven so that new input video signals are continuously recorded thereon as indicated in step S14 in FIG. 2B through a tab "B". Whereas, if the flag F2 has been set at logic 1 in step S11, new input video signals will be continuously recorded on the video tape loaded in the second deck 25 as indicated in step S24.

However, because neither the first deck nor the second deck is designated at present, it should be determined which one is operable in the recording mode in steps 20 or S21. The determination of the operable deck may be achieved by checking the presence of a tape in the corresponding deck through the use of a conventional loading sensing switch.

If the test result is YES in step S20, control proceeds to step S12 in FIG. 2B through a tab "C" where the flag F1 is set at H level. The flag having the H level will be used to reference whether either of the decks is related to the continuous recording operation as described above. And then, in step S13, it is checked whether the predetermined time has elapsed or not. At this time, if the flag F3 is still H level, the recording operation on the tape loaded in the first deck 15 is maintained; otherwise, control flows to step S2 in FIG. 2a through a tab "G".

The microcomputer successively checks the count of the timer in step S15 and checks the ending of the tape loaded in the first deck 15 during the recording operation in step S17. When the recording operation for the predetermined time is completed in step S15, the first deck stops the recording mode to enter a stand by state for a subsequent operation. In step S17, if the tape is ended in the course of the recording operation, the recording operation should be transferred from the first deck 15 to the second deck 25. Therefore, the microcomputer 30 clears the flag F1 in step S18 and ejects the tape from the first deck 15 in step S19. And then, control proceeds to step S21 in FIG. 2C through a tab "D" to determine if the other deck, that is, the second deck 25, is operable in the recording mode as described above. If the second deck 25 does not have a tape loaded therein in step S21, an alarm signal may be generated to advise the user of this situation as in step S30. However, if the second deck is operable in step S21, the microcomputer 30 sets the flag F2 at H level as in step S22 and checks the flag F3 in step S23. If the flag F3 is in H level in step S23, the recording operation on the tape is continued to the tape loaded in the second deck 25 in step S24. During the recording operation, it is tested whether the tape is ended in step S27. If the test result is YES, the microcomputer clears the flag F2 in step S28 and ejects the tape from the second deck 25 in step S29. If not, control passes to step S2 in FIG. 2A through the tab "G". And then, control proceeds to step S20 form step S29 through a tab "E" to determine if the other deck, that is, the first deck 15, is operable in the recording mode. And then, subsequent operation will be repeated from either step S12 or S21.

While the present invention has been shown and described with reference to a particular embodiment, it will be apparent to those skilled in the art that many changes and modifications may be made without departing from the spirit and scope of the invention as defined in the claims.

What is claimed is:

1. A method for continuously recording, on units of a predetermined period of continuous recording time, video signals irregularly supplied from a video camera installed at a restricted area on a selected video cassette tape loaded in a selected deck within a two-deck video cassette recorder, said video cassette recorder having an adjustable time switch and means for continuously sensing the restricted area and generating a trigger signal, comprising the steps of:
   (a) setting the predetermined period of continuous recording time by using the adjustable time switch;
   (b) registering a reference signal to indicate that the selected back is operable to continuously record the video signals;
   (c) in response to the trigger signal, continuously recording the video signals on the selected video cassette tape loaded in the selected deck during said period of continuous recording time, while referencing the registered reference signal;

(d) maintaining the selected deck in a stand-by state for a subsequent recording operation when another trigger signal is generated after the completion of the recording operation in the selected deck for the period of continuous recording time;

(e) repeating steps (c) and (d) until the selected video cassette tape loaded in the selected deck is fully recorded;

(f) registering a new reference signal to indicate that the remaining deck within the two-deck video cassette recorder is selected when the video cassette tape in the previously selected deck is fully recorded; and (g) repeating steps (c) to (f) until said remaining deck is fully recorded.

2. The method of claim 1, further comprising the steps of clearing the reference signal registered in step (b) when the new reference signal is registered in step (f) and exchanging the fully recorded video cassette tape with a new one.

3. The method of claim 1, further comprising the steps of transferring the recording operation from the selected deck to the remaining deck to continuously record the video signals during the remainder of said period of continuous recording time in step (c) and repeating steps (d) to (g) until said remaining deck is fully recorded.

* * * * *